INVENTOR.
Wallace F. Mitchell
BY
Lidley, Beardsley & Bradley
Att'ys.

March 16, 1965 W. F. MITCHELL 3,173,446

SAFETY VALVE MEANS FOR PROTECTING AGAINST THE LOSS OF FLUID IN A PRESSURIZABLE FLUID SYSTEM

Filed Feb. 13, 1962 6 Sheets-Sheet 2

INVENTOR.
Wallace F. Mitchell
BY
Fidler, Bradley & Bradley
Att'ys.

March 16, 1965 W. F. MITCHELL 3,173,446

SAFETY VALVE MEANS FOR PROTECTING AGAINST THE LOSS OF FLUID IN A PRESSURIZABLE FLUID SYSTEM

Filed Feb. 13, 1962 6 Sheets-Sheet 3

INVENTOR.
Wallace F. Mitchell
BY
Fisher, Beardsley & Bradley
Attys.

March 16, 1965 W. F. MITCHELL 3,173,446

SAFETY VALVE MEANS FOR PROTECTING AGAINST THE LOSS OF FLUID IN A PRESSURIZABLE FLUID SYSTEM

Filed Feb. 13, 1962 6 Sheets-Sheet 4

INVENTOR.

Wallace F. Mitchell

BY

Fisher, Beardsley & Moultey

Attys.

INVENTOR.
Wallace F. Mitchell
BY
Fidler, Beardsley & Bradley
Att'ys.

INVENTOR.
Wallace F. Mitchell
BY
Fidler, Beardsley & Bradley
Attys

United States Patent Office 3,173,446
Patented Mar. 16, 1965

3,173,446

SAFETY VALVE MEANS FOR PROTECTING AGAINST THE LOSS OF FLUID IN A PRESSURIZABLE FLUID SYSTEM

Wallace F. Mitchell, Arlington Heights, Ill., assignor to Guenther-Mitchell Co., Park Ridge, Ill., a partnership Filed Feb. 13, 1962, Ser. No. 173,007
5 Claims. (Cl. 137—498)

This invention relates to safety valves and more particularly to a safety valve for use in compressed air control systems wherein one or more air actuated devices are energized from a source of pressurized air, such safety valve serving to protect against loss of air pressure in the event of rupture of an air line connected to the device or devices or failure of one or more of the devices.

The invention is especially well adapted for use in connection with air brake systems such as used on trucks and particularly trailer trucks or semi-trailer trucks and is disclosed in connection therewith but is not limited thereto. In such systems the brake or brakes are connected to a source of air under pressure through piping and if there is a rupture in the line or failure in the brake cylinder or booster, or a slow leak, air escapes with the result that the air brake or brakes fail to operate because of the loss of pressure within the system.

In air brake systems of the type to which the present invention relates, all of the brakes are connected in parallel to the source of compressed air, and thus if there is a rupture in the line or failure in the brake cylinder or booster the air pressure is rapidly dissipated with the result that none of the brakes can be operated.

In accordance with the present invention a safety valve is provided whereby upon a rupture of the air line or failure in the brake cylinder or booster, or other failure such as a slow leak the line is closed to halt the flow of air to the point of rupture so that the air within the system is retained and available for actuating any brakes connected to the system at portions other than those in which the failure occurs. For example, where there are two brakes on a single axle and lines connected to each of such brakes and a rupture occurs in the line leading to one of the brakes, the valve of the present invention cuts off the flow of air to the line in which the rupture occurs whereby the other line remains operative. In a like manner in a system where there are two sets of brakes on two axles a rupture of the air line leading to two of the brakes on a single axle will not cause loss of air in the system as the valve of the present invention will shut off the air to the two brakes and thus maintain the pressure in the system.

An object of the present invention is to provide a new and improved safety valve for use in compressed air control system.

Another object is to provide a safety valve for vehicle brake control systems wherein upon the application of braking pressure in the system the valve is effective to permit an unimpeded flow of air to the brakes except when there is a failure in the system beyond the valve.

Another object is to provide a safety valve for vehicle brake control systems which valve embodies a flexible diaphragm for cutting off the flow of air from the system whenever there is a failure in the line leading to the cylinder or in the cylinder or a slow leak and wherein the diaphargm is disposed closely adjacent a seat for quickly closing the line upon any failure beyond the seat but is displaced further away from the seat upon the application or release of braking pressure in order to permit rapid flow of air through the outlet.

Another object is to provide a safety valve for vehicle brake control systems which valve embodies a flexible diaphragm for cutting off the flow of air from the system whenever there is a failure in the line leading to the brake control cylinders or in the cylinder or a slow leak and wherein the diaphragm is disposed closely adjacent to a seat for quickly closing the line upon any failure beyond the seat and wherein means are provided for causing the diaphragm to be displaced further away from the seat during the flow of air through the seat and is held away from the seat until the brake is fully applied.

Still another object is to provide a safety valve for vehicle brake control systems which valve embodies a flexible diaphragm formed of rubber or rubber-like material for cutting off the flow of air from the system whenever there is any failure in the line beyond the valve or in the brake control system and wherein the diaphragm is flexed upon each application of air under pressure to the valve regardless of whether there is a failure, thereby maintaining the flexibility of the diaphragm over a long period of use.

Another object is to provide a safety valve for vehicle air brake control systems wherein whenever the brakes are applied at a time when there is a rupture of the air line to any of the brake cylinders or boosters or failure in the cylinders or booster, or other failure, a signal is energized to warn the operator of such failure and loss of braking power.

A further object is to provide a safety valve for vehicle air brake control systems wherein a pair of flexible diaphragms are provided for cutting off the flow of air to either or both of two brake control cylinders or boosters upon the rupture of either or both of the lines leading to the two brake control cylinders or boosters or failure in either or both of the cylinders.

Another object is to provide a safety valve for vehicle air brake control systems wherein upon the release of the braking pressure applied to the brake control cylinder or booster the safety valve operates to permit maximum ease of exhaust flow of air from the air brake cylinder.

Another object is to provide a safety valve for vehicle air brake control systems having a pair of diaphragms for cutting off the flow to either or both of the air brake control cylinders or boosters upon the rupture of one or both of the lines leading to the air brake cylinders or boosters or other failure and wherein the movement of the diaphragms is controlled by the pressure of the air on both faces of each diaphragm.

Another object is to provide a safety valve for vehicle air brake control systems having a diaphragm for cutting off the flow of air to the brake control cylinder or booster and wherein the flow of air when a line is ruptured or the brake cylinder or booster fails causes reduced pressure upon one face of the diaphragm and an increased pressure upon the other face to cause the diaphragm to move rapidly and positively to line closing position to cut off the flow of air to the ruptured line.

Another object is to provide an air brake system embodying a novel valve for closing the system in the event of a rupture of the air line leading to the brake cylinder or booster or failure of the brake cylinder or booster.

Other objects and advantages of the invention will appear from the following description taken in connection with the appended drawings wherein.

Figures 1, 2:
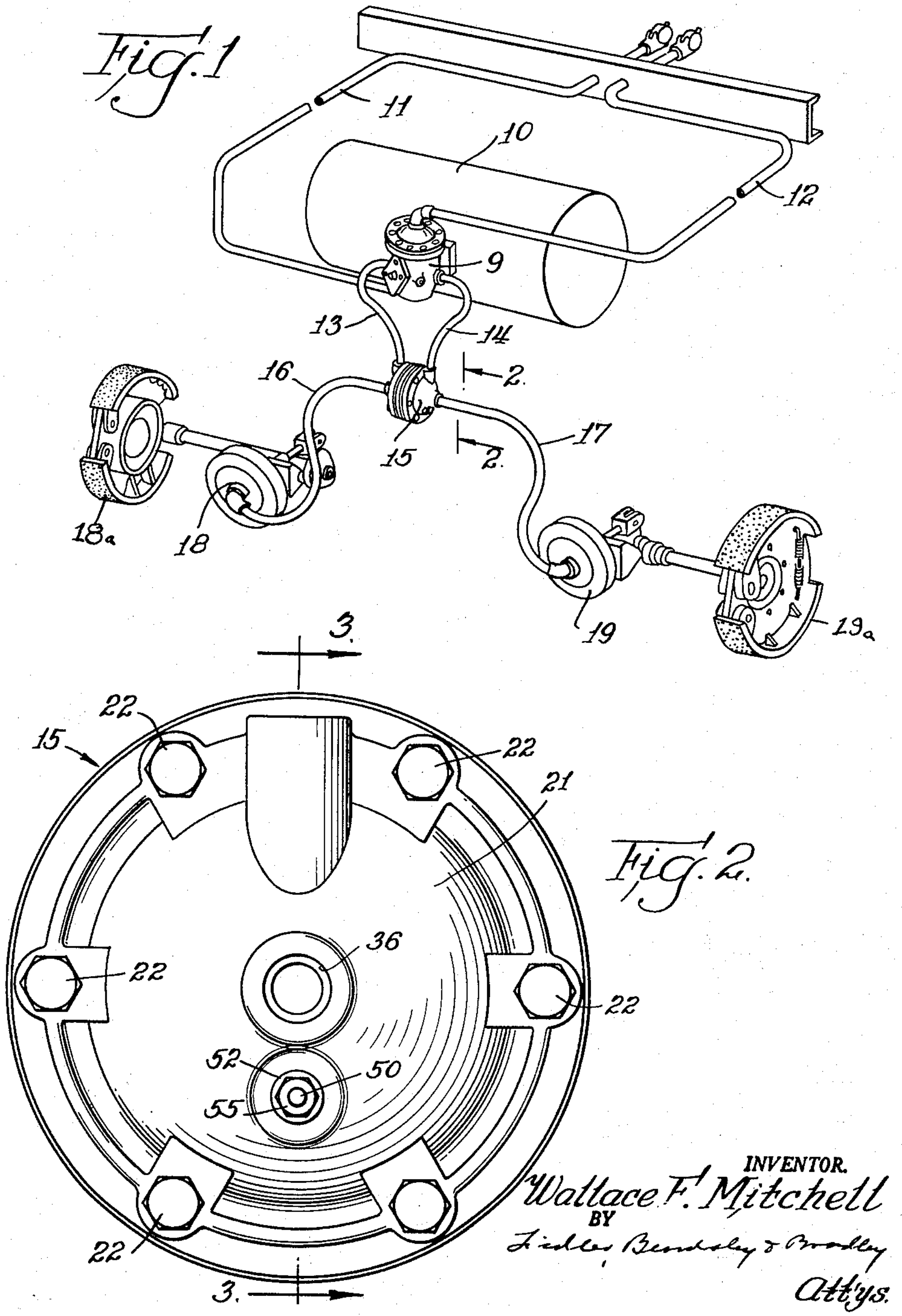
FIGURE 1 is a schematic perspective view of an air brake system incorporating one embodiment of the present invention.
FIG. 2 is a plan view taken along line 2—2 of FIG. 1 of a safety valve constructed in accordance with the invention.

The valve of the present invention is suitable for use in many different types of compressed air control systems but is particularly well adapted for use in a braking system wherein the valve controls the flow of air to two brake control cylinders controlling brakes located on a single axle and the invention will be illustrated and described in connection with such embodiment. However, the invention provides not only a double valve especially well adapted for use with two brakes but a single valve which may be used in connection with one brake, or one line connected to two or more brakes and is also disclosed in such embodiment.

In accordance with the invention, the safety valve includes a casing defining a chamber having an inlet and an outlet, a diaphragm being provided which divides the chamber into an air flow compartment and a compensating compartment. The inlet, air flow compartment and outlet form an air flow passage through the casing. A seat is provided around the outlet from which the diaphragm is normally spaced and against which the diaphragm is adapted to seat to close off air flow through the valve when the pressure in the compensating compartment is sufficiently greater than the pressure in the air flow compartment. A reduced "sensing" passage connects the inlet with the compensating compartment whereby upon an initial flow of air through the air flow compartment under operating, or releasing pressure, the pressure in the air flow compartment is greater than in the compensating compartment and the diaphragm is moved away from the seat but if such flow continues beyond a predetermined period (as when there is a break or major leak in the line) the pressure builds up in the compensating chamber and the diaphragm is caused to move to closing position. Also, if there is a slow leak in the line beyond the valve, the continuation of the air passing through the inlet 35 and past the outer ends of the tubes **45*a* or 45*b*** will cause enough difference in pressures in the compartments to cause the diaphragm to close.

One illustrative embodiment of an air brake system in which the present invention may be used is shown in FIG.

1 of the drawings. The structure includes a reservoir 10 containing compressed air to which control lines 11 and 12 are connected and which lead from suitable control means (not shown) for controlling the application and release of the brakes. Suitable compressor means (not shown) are provided for maintaining the pressure of air within the reservoir 10. Connected to the reservoir 10 is a relay valve 9 of conventional construction to which is connected conduits 13 and 14 leading to the safety valve 15 of the present invention. Conduits 16 and 17 are connected to the safety valve 15 and lead to air brake control cylinders 18 and 19 which may be of conventional construction and which are connected to brakes **18*a* and 19*a*** respectively.

The function of the safety valve 15 is to permit the flow of air from the line 13 to the line 16 and from the line 14 to the line 17 when the air brakes are working properly and to prevent the flow of air to either of the lines 16 or 17 whenever there is a rupture or leak in such line or the connected brake cylinder fails or there is a slow leak in the system beyond the valve. For example, if the line 16 should rupture or if the associated brake cylinder 18 should fail and permit free escape of air, the safety valve 15 will function to prevent the loss of compressed air from the line 13. Thus, the escape of air and consequent reduction of air pressure in the system will be prevented and the remaining brakes, for example, the air brake 17, may still be operated.

The safety valve of the present invention is particularly well adapted for use in controlling the flow of air to two air brake control cylinders but, as will be understood, it may be used for controlling the flow of air to a single brake cylinder or to a single set of air cylinders connected to a single pipe or it may be used for controlling the flow of air to two air cylinders separately or two sets of air cylinders separately.

The valve of the present invention comprises a casing 20 (FIG. 3) preferably formed by two similar casing sections or halves 21, which are suitably secured together as by bolts 22 to define a chamber 23. For convenience, the casing sections 21 may be identical in construction.

Secured between the casing sections 21 are diaphragms **25*a*, 25*b*, hereinafter more fully described in detail and which divide the chamber 23 into three compartments, namely two outer, air flow compartments 26*a*, 26*b*, and an intermediate, compensating compartment 27. A spacer 28 of annular form which may be formed of suitable material such as rubber, plastic or metal is interposed between the peripheral portion of the diaphragms 25*a*, 25*b*. Thus, the diaphragms 25*a*, 25*b*, are clamped between the spacing ring 28 and the two casing sections 21, 21** respectively.

The diaphragms are formed of flexible, resilient material such as rubber or a rubber-like plastic, as for example a synthetic rubber, which retains its flexibility and resiliency over a long period of use and remains impervious to the flow of air therethrough and to the deleterious effects of moisture and oil which may be entrained in the air passing through the valve.

At its peripheral portion each diaphragm has imbedded therein and bonded thereto a stiffening element 30 formed of rigid material, preferably metal, of generally annular shape which is of such width as to extend over substantially the entire area between the adjacent casing section 21 and the spacing ring 28 and inwardly thereof and into the chamber 23 to a sufficient extent to prevent undesired displacement of the diaphragm. In other words, the reinforcing ring 30 insures that only the portion of the diaphragm inwardly of the clamped portion is displaced during operation into a bowed form and that the diaphragm does not "warp" or become displaced in an irregular manner such as to prevent the diaphragm from closing against the seat hereinafter described. The diaphragm is reinforced and stiffened in its central portion by a reinforcing disc 31 formed of rigid material, preferably metal, which is embedded in the diaphragm. The reinforced portion of the diaphragm is of an area which is equal to or slightly greater than the area of the seat hereinafter described and with which the diaphragm cooperates.

Formed in the casing halves 21 are inlet openings 35*a*, 35*b*, which may be threaded for connection of pipes or conduits such as the pipes 13 and 14 which open into the corresponding compartments 26*a*, 26*b*. Each inlet opening preferably opens into its respective compartment peripherally thereof, but this is not essential and the inlet openings may be provided at another portion of the casing.

Outlet openings 36*a*, 36*b*, lead from the compartments 26*a*, 26*b*, each of which outlet opening is provided in the casing half 21 at the central portion thereof and is aligned with the axis of the casing. Each outlet opening 36 is formed in a boss 37 which extends into the corresponding compartment and into close proximity with the corresponding diaphragm. The inner end of the two bosses 37 serve as seats 38*a*, 38*b*, against which the central, reinforced portion of the corresponding diaphragm is adapted to seat when the diaphragm is displaced to thereby close the outlet and prevent the passage of air from the compartment. The arrangement is such that the central portion of each diaphragm is disposed opposite the corresponding seat and is normally spaced therefrom. In its normal position each diaphragm while being spaced from its seat sufficiently to allow air to flow through the outlet, is nevertheless sufficiently close so that only a slight outward movement (movement toward the seat of the diaphragm) is sufficient to close the outlet.

Means are provided for distributing air entering each compartment around the perimeter of the compartment whereby the pressure of such air against the diaphragm is substantially uniform and the diaphragm is not unevenly distorted, but when displaced by the pressure of air in the compartment or by the reduction of pressure in the compartment is displaced in a bowed manner symmetrically about the center line of the diaphragm, and of the casing 20. To this end a baffle 40 is provided which preferably is of disc shape and is supported on each boss 37 in parallel relation to the corresponding diaphragm and in surrounding but outwardly displaced relation to the corresponding seat.

The baffle 40 extends laterally from the seat a sufficient distance so that it closely approaches the peripheral wall of the compartment and closely approaches the inner end of the corresponding inlet leaving only a relatively small space between the peripheral edge of the baffle 40 and the peripheral wall of the corresponding compartment. Thus, the baffle causes the incoming air to impinge against the diaphragm at the perimeter which is held against displacement. Hence, a sudden surge of air into the chamber 26 will not cause the diaphragm to be distorted by such surge. The diaphragm will only be moved inwardly in a normal way as hereinafter explained.

Communication between the inlets 35*a* and 35*b* and the intermediate, compensating chamber 27 is provided by tubes 45*a*, 45*b*, each having one end projecting into the inlet and formed with an opening 46 which is inclined toward the inlet end of the corresponding inlet, as shown. Each of the tubes 45*a* and 45*b* is secured as by a force fit in its casing section 21 and extends through the corresponding diaphragm and stiffening element and into the intermediate chamber 27 adjacent at the peripheral portion thereof. The inner end of each tube 45*a*, 45*b*, is closed and adjacent the closed end an orifice 47 is provided which opens into the intermediate chamber 27 so that there is communication between each inlet 35 and the intermediate chamber 27. The diameter of each tube end of the orifice 47 is such as to provide only restricted communication between each inlet 35 and the intermediate chamber 27 as hereinafter explained.

Means are provided in each casing half for giving an alarm or signal if a line leading from either outlet should break when the brakes are being applied or if the brakes are applied when the line is broken. The arrangement is such that the alarm or signal is given at any time that the pressure in either outlet 36*a* or 36*b* is substantially lower than the pressure in the corresponding compartment 26*a* or 26*b*. The alarm means in the two casing halves are identical and hence only one will be described in detail.

The alarm means includes a contactor 50 which preferably takes the form of a screw extending through an opening 51 in the wall of the casing section 21 and through insulating bushings 52 and 53. A nut 54 is threaded onto the screw 50 and serves to clamp the insulating bushings 52 and 53 against the wall of the casing half 21 and thus secure the screw 50 in position. A second nut 55 is threaded on the screw 50 and serves to connect a conductor 56 to the screw 50 which conductor is connected, in turn, with a signal or alarm device 57 which may be a lamp and a battery 58 which is connected to ground. The casing section 21 is grounded as indicated at 96.

A contact spring 60, of triangular shape, for example, is supported in a bore 59 in the casing aligned with the opening 51 and at a position slightly above the top surface of the head of the screw 50 whereby upon downward displacement of the center of the contact spring, contact is made between the contact spring and the screw 50. Disposed above the contact spring 60 is a diaphragm 61 which is held in place suitably as by a ring 62 fitted in the bore 59. The arrangement is such that upon the application of fluid pressure to the diaphragm 61 the latter is displaced outwardly and the contact spring 60 is moved into contact with the head of the screw 50. The head of the bushing 52 is seated in a bore 63 which communicates through a passage 64 with the outlet 36 whereby the pressure of air in the bore 63 is the same as the pressure of the air in the outlet 36. Thus, any differential between the pressure in either compartment 26*a* or 26*b* and the corresponding outlet 36*a* or 36*b* is effective to displace the corresponding diaphragm 61 and move the contact spring relatively to the screw 50.

The valve is symmetrical about a medial plane and thus both the casing sections 21 and the contents thereof are identical in all respects.

Figures 3, 4, 5, 10:
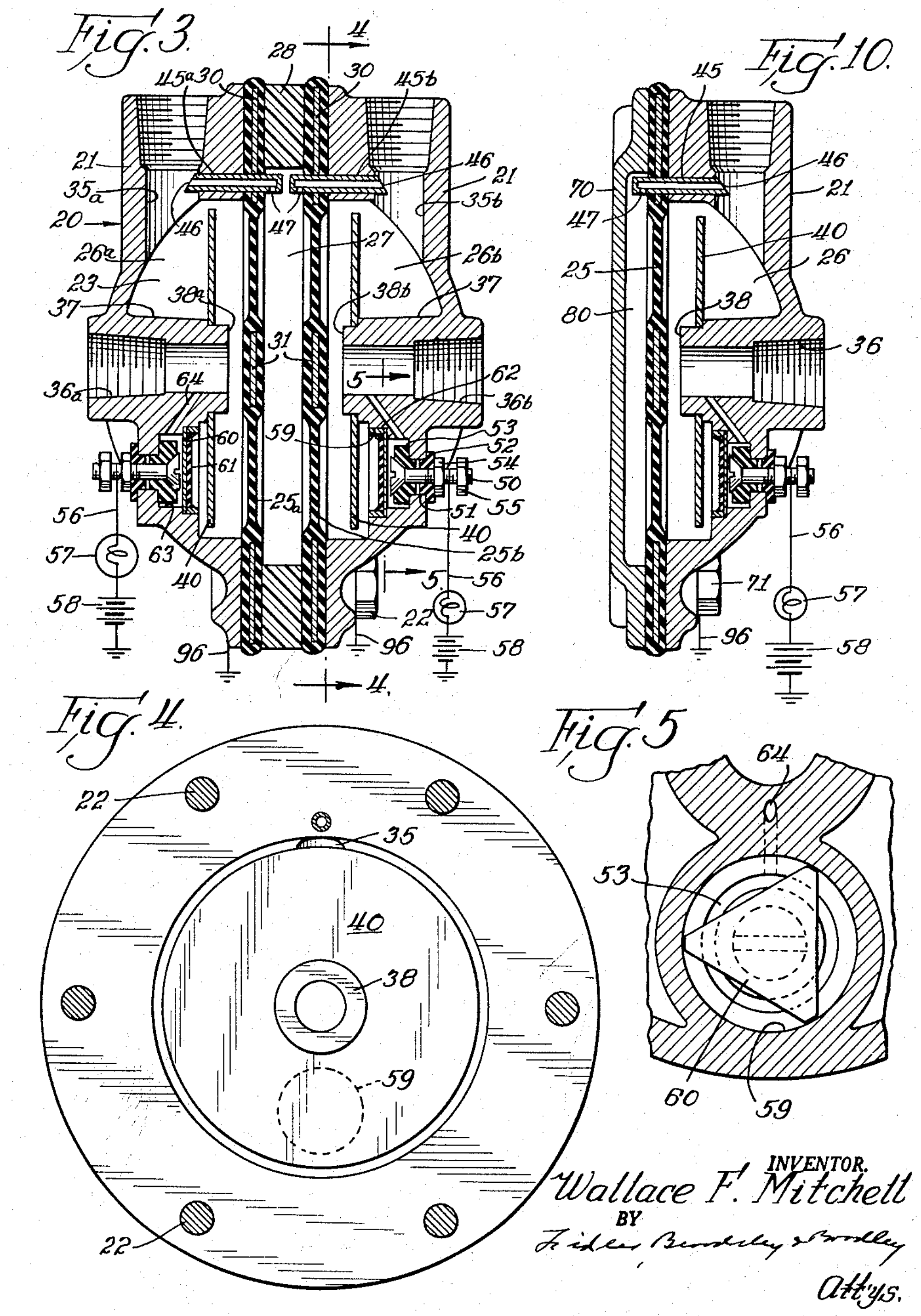
FIG. 3 is a view of a section taken along line 3—3 of FIG. 2 in which also is shown somewhat diagrammatically certain electrical connections.
FIG. 4 is a view of a section taken along line 4—4 of FIG. 3.
FIG. 5 is an enlarged view of a section taken along lines 5—5 of FIG. 3.
FIG. 10 is a sectional view of a second embodiment of valve constructed in accordance with the present invention.
Figure 6:
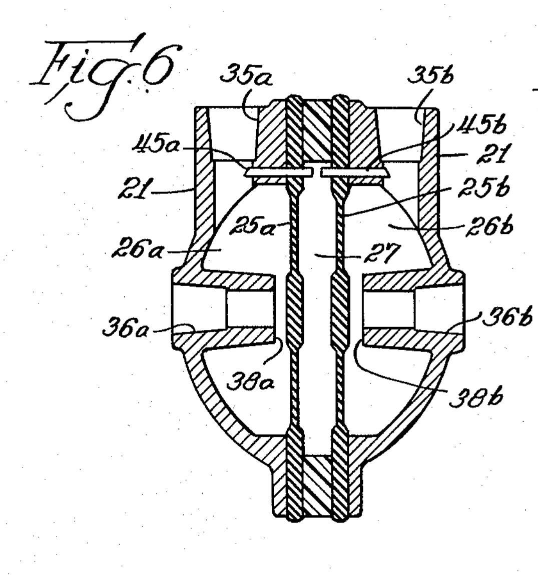
FIG. 6 is a diagrammatic sectional view showing the valve in the position which the parts assume when equal pressures are applied on opposite sides of the two diaphragms.
Figure 7:
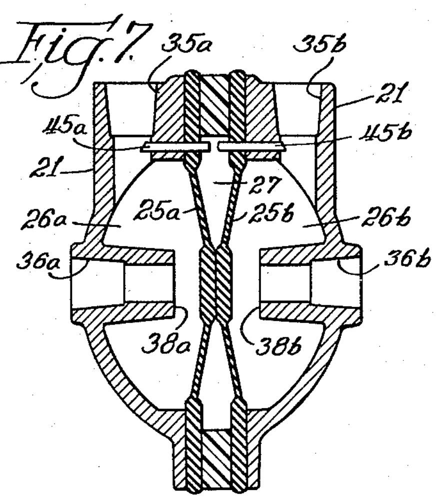
FIG. 7 is a diagrammatic, sectional view showing the condition of the diaphragms when braking pressure is applied to the valve and there is no rupture of the air lines.

In use, the casing 20 is connected to the inlet lines 13 and 14 which communicate respectively with the two inlets 35*a* and 35*b* respectively and is connected to the lines 16 and 17 (FIG. 1) which communicate with the two outlets 36*a*, 36*b* respectively. When the relay 9 is inactive and no air pressure is applied to the valve 15, the diaphragms 25*a*. 25*b* assume their normal positions as shown in FIGS. 3 and 6 in which positions they are displaced slightly from the seats 38*a*, 38*b* respectively. When the brake control means (not shown) is actuated, thus actuating the relay 9 and admitting air from the cylinder 10 to the casing 20 air flows rapidly under line pressure into the compartments 26*a*, 26*b*. Owing to the fact that there is only atmospheric pressure in the intermediate chamber 27, the diaphragms 25*a*, 25*b* are displaced inwardly which inward movement (that is, away from their respective seats) is halted by their mutual engagement, as shown in FIG. 7.

The restricted passages provided by the tubes 45*a*, 45*b* and their respective orifices 46 prevents the rapid entry of air into the intermediate compartment 27 and thus there is no substantial opposition to the inward displacement of the diaphragms 25*a*, 25*b*. The movement of the central portions of the diaphragms 25*a*, 25*b* inwardly away from the seats 38*a*, 38*b* provides a wide space between the central portions and the respective seats and thus there is no interference with the free flow of air through the compartments 26*a*, 26*b* and out through the outlets 36*a*, 36*b* to the respective brake cylinders 18 and 19 (FIG. 1). On the other hand, it will be noted at this point that when the diaphragms are in their normal positions (as shown in FIGS. 3 and 6) the central portions thereof are disposed relatively close to the seats 38a, 38b so that only a very silght movement toward the seats is necessary to seat the central portions against the seats.

After the first surge of air through the compartments 26a, 26b, which causes application of the brakes, the continued application of pressure to the brakes is maintained so long as the relay is energized. However, owing to the fact that the compartments 26a, 26b, communicate through the tubes 45a, 45b, and their orifices 47 with the intermediate compartment 27 the pressure in the compartments 26a, 26b, and the compartment 27 is soon equalized and the diaphragms 25a, 25b, return to their normal positions (FIG. 6) wherein they are spaced closely adjacent the seats 38a, 38b.

The inclined form of the outer end 46 of each of the tubes 45a, and 45b serves to "shear off" air from the stream which flows rapidly past the end during the surge and air is thus forced through the tube and into the central compartment 27. However, the small size of the orifice 47 prevents air from flowing so rapidly into the chamber as to cause the diaphragm to again move outwardly and close against its seat.

The size of the orifice is selected so as to provide a throttling action on the air passing into the chamber which insures that the diaphragm is held in a position widely spaced from its seat (FIG. 7) for a sufficient time for the brake to be set. That is to say the diaphragm is prevented from moving outwardly any appreciable distance until sufficient air under pressure has flowed through the valve to fill the brake cylinder and build up sufficient pressure to set the brake. The tube and orifice permit air to flow into the intermediate compartment so that after the brake has been set, the pressures in the outer compartment and the intermediate compartment are equalized and the diaphragm returns to its normal position (FIGS. 2 and 6).

When the relay 9 is operated to release the air pressure on the brakes and thereby release the brakes a reverse flow of air occurs through the outlets 36a, 36b, the compartments 26a, 26b and the inlets 35a, 35b. This surge of air causes the diaphragms 25a, 25b to be displaced inwardly and away from their respective seats 38a, 38b (as shown in FIG. 7) so as to permit maximum flow of air through the compartments 26a, 26b and out through the inlets 35a, 35b. This action is assisted by the aspirator effect of the air flowing past the outer ends of the tubes 45a, 45b. In other words, the flow of air past the outer ends of the tubes 45a, 45b, creates a reduction of pressure in the tubes which reduces the pressure in the intermediate chamber 27 and aids in the movement of the diaphragms 25a, 25b inwardly and away from their respective seats 38a, 38b.

Figure 8:
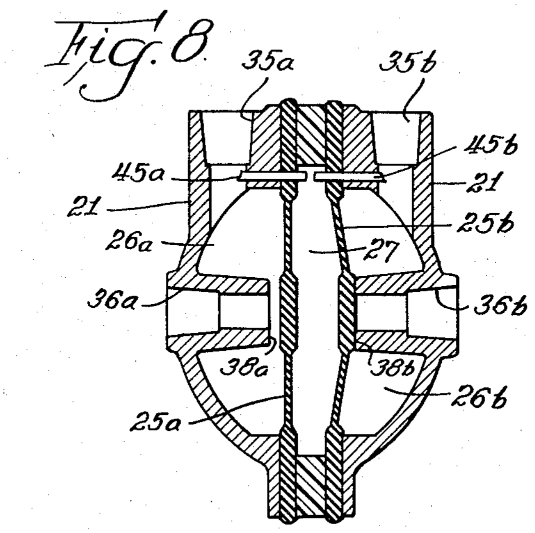
FIG. 8 is a diagrammatic, sectional view of the valve showing the condition of the diaphragms when braking pressure is applied to the valve and one of the lines is ruptured.

In the event that the brakes are applied when one of the lines, for example the line 17, is ruptured, or the brake cylinder 19 has failed, air enters the chamber 26a connected to the line 13 under line pressure, that is under the pressure induced by the pressure of the air in the reservoir 10. At the same time the pressure in the chamber 26b connected to the lines 14 and 17 is reduced, whereby the corresponding diaphragm 25b is moved toward its seat 38b and closes the corresponding outlet 36b (FIG. 8) to halt the flow of air out of the casing 20 to line 17. Air flows through the tube 45a from the inlet 35a which is connected to the line 13 and into the intermediate compartment 27 to raise the pressure therein, which aids in moving the diaphragm 25b against its seat 38a. When the diaphragm 25b closes the outlet 38b, normal line pressure is restored in the chamber 26b. The pressure in the chamber 27 also is normal line pressure. The area of the diaphragm 25b against which air in the chamber 27 is applied tending to urge the diaphragm against the seat 38b is greater by the extent of the overall area of the seat than the area of the diaphragm against which air in the chamber 26b is applied tending to urge the diaphragm away from the seat. Consequently, there is a net force urging the diaphragm against its seat so long as line pressure is applied. The diaphragm remains against the seat and there is no loss of air through the line 17. This condition obtains so long as the relay is energized to supply braking air to the valve 15. When the relay is released the diaphragms 25a, 25b return to their normal poistions. Since there is no pressure in the line 17, the diaphragm 25b is displaced inwardly to allow free return of air.

If the brakes are again applied, that is, if the relay 9 is again energized, the diaphragm 25b will move to the position shown in FIG. 8 and again close the outlet 36b to prevent any loss of air and the brake cylinder 18 will again be energized. Thus, whenever the relay 9 is actuated to apply the brakes, the brake cylinder 18 will be actuated even though line 17 is ruptured or the brake cylinder 19 has failed.

Figure 9:
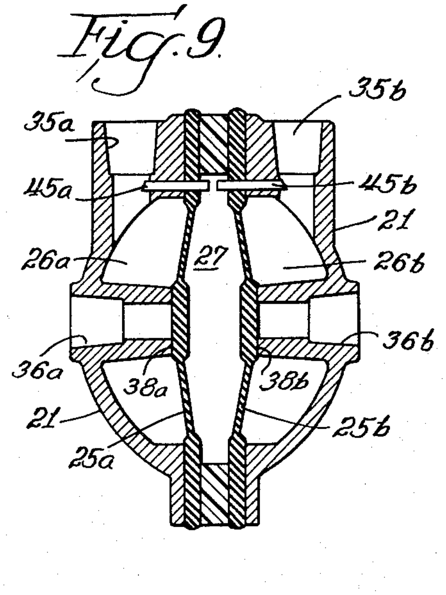
FIG. 9 is a diagrammatic, sectional view showing the condition of the diaphragms when braking pressure is applied to the valve and both air lines are ruptured.

If at a time that the line 17 is ruptured or the cylinder 19 has failed the line 16 should rupture or the cylinder 18 fail, the reduction in pressure in the chamber 26a connected to the line 16 causes the diaphragm 25a to move into contact with the seat 38a (FIG. 9) and seal the chamber 26a connected thereto so that there is no loss of pressure in the system. The higher pressure then present in the chamber 27 also aids in moving the diaphragm 26a toward the seat 38a. When the diaphragm 25a is against its seat 38a the air pressure needed to maintain braking pressure on the remaining brakes and in chamber 26b will keep the valve closed by means of pressure differential.

If the brakes are applied at a time when both of the brake lines 16 and 17 are ruptured or the cylinders 18 and 19 have failed, the reduction of pressure in the chambers 26a, 26b causes both of the diaphragms 25a, 25b to move outwardly into engagement with their respective seats 38a, 38b to close the outlets 36a, 36b. This action is augmented by the fact that as air flows past the inclined openings 46 of the tubes 45a, 45b the air is "sheared off" and passes through the tubes and into the intermediate chamber 27 to increase the pressure therein and urge the diaphragms 25a, 25b outwardly.

The reduction of pressure in the chambers 26a, 26b and the increase in pressure in the chamber 27 causes both of the diaphragms 25a, 25b to be moved outwardly against their respective seats 38a, 38b (FIG. 9) and to close the outlets so that no air passes out of the housing 20 and the pressure in the system is maintained.

If the brakes are released at a time when both of the lines are ruptured or both the cylinders have failed, both diaphragms return to their normal positions (FIG. 6). Since there is no pressure in either line, the diaphragms are not displaced inwardly. When the brakes are again applied, the diaphragms close both outlets and prevent loss of air from the system.

If a line leading from either outlet should break or the cylinder should fail at a time when the brakes are applied, or the brakes should be applied at a time when a brake line is broken or failed, the corresponding signal will operate to notify the operator of such condition. If either such condition occurs, the pressure in the outlet is lower than the pressure in the chamber. Thus, the diaphragm 61 is forced outwardly and urges the contactor 60 against the head of the contactor 50. This completes a circuit through the signal lamp 57 to activate the signal. When the pressures in the outlet 36 and the chamber 26 are equalized, the signal device is de-energized.

In addition to halting the air flow through the valve when the line is ruptured or develops a large leak, the valve also is operative to halt the flow in the event of a small or slow leak in the line beyond the valve and thus the operator is warned of such slow leak. In this event air flows through the air flow passage from the inlet to the outlet in the usual manner when braking pressure is applied. However, after the initial rapid flow of air through the valve, and brake cylinder or booster is filled, the air continues to flow slowly through the air flow compartment. Owing to the differential in pressure over the tube leading to the compensating compartment, air continues to flow into the compensating compartment and the pressure in the latter is increased over the pressure in the air flow compartment and the diaphragm is moved to closed position.

The rate of closing of the diaphragm upon the occurrence of a rupture in the line can be adjustably controlled by the design of the "sensing" tubes (*45a* and *45b*) and especially by the size of the "sensing" orifice 47. The larger the orifice the more rapidly is the pressure in the compensating compartment built up and the more rapidly the diaphragm closes in the event of a leak and vice versa. Likewise the closing of this valve upon a slow leak can be adjusted by selecting the size of the orifice so that it will close whenever the rate of air flow due to leakage exceeds a selected value.

Either of the casing halves 21 and the associated parts, as shown in FIGS. 2 to 5, may be employed in forming a single safety valve such as illustrated in FIG. 10. It is only necessary to apply a cover member 70 which is secured to the casing section 21 in suitable manner as by bolts 71 to clamp the diaphragm 25 between the casing member 70 and the casing section 21. The structure of the single valve not described is the same as the structure of one of the halves of the double valves of FIGS. 1 to 5. Such a valve may be connected in a single line between the relay 9 and one of the brake actuating cylinders 18 and 19. On the other hand, the single valve such as shown in FIG. 10 may be connected between the relay 9 and both of the brake actuating cylinders 18 and 19 by a suitable fitting (not shown) whereby the outlet 36 is connected to both lines 16 and 17. In this event, however, the valve will operate to shut off the air pressure to both brakes when either or both of the lines 16 and 17 is ruptured or the brake cylinders 18 and 19 fail.

The operation of the single form of safety valve is generally similar to the operation of either half of the double form of valve shown in FIGS. 1 to 5 and described hereinabove. In the operation of this form of the invention the diaphragm will remain in its normal position when there is no pressure in the casing defined by the casing section 21 and the cover 70. When braking pressure is applied the flow of air into the casing displaces the diaphragm 25 away from the seat 38 to permit free flow of air through the outlet 36. Immediately upon the application of braking pressure air flows through the tube 45 and into the compartment 80 defined between the diaphragm 25 and the cover 70 to equalize the pressure in the chambers 26 and 80 whereupon the diaphragm 25 returns to its normal position. Upon release of the relay 9 the back flow of air through the chamber 26 displaces the diaphragm 25 away from the seat 38 to permit free flow of air through the casing.

Should the line which is connected to the outlet 36 be ruptured or the cylinder fail the rapid flow of air through the casing and the corresponding reduction of pressure in the chamber 26 will cause the diaphragm 25 to be displaced toward and into engagement with the seat 38 thereby shutting off further flow of air to the chamber 26. The pressure in the chamber 26 and the chamber 80 is equalized through the tube 45. Thus, since the area of the diaphragm facing the chamber 80 is greater than the area of the diaphragm facing the chamber 26 by an amount equal to the area of the maximum dimension of the seat 35 the diaphragm 25 will remain against the seat 38 so long as any pressure is applied to the valve. When the pressure is released the diaphragm 25 will return to its normal position. However, upon the next application of the brake, if the line is still ruptured or fails, the flow of air through the casing will result in the application of the establishment of a greater pressure in the chamber 80 than in the chamber 26 so that the diaphragm 25 is again urged into engagement with the seat 38 to close the outlet 36.

Figure 11:
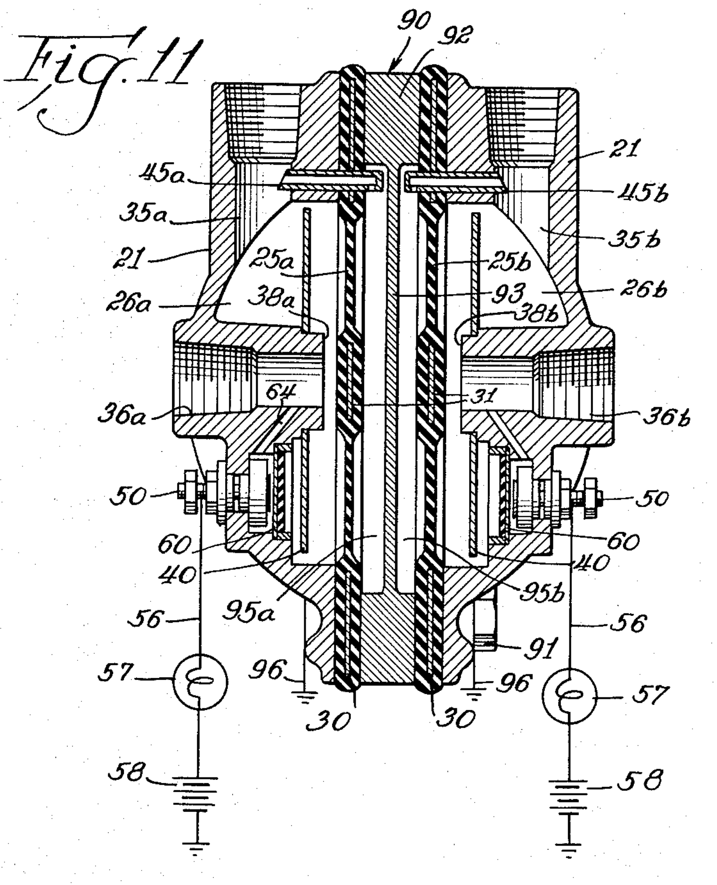
FIG. 11 is a sectional view of a third embodiment of valve constructed in accordance with present invention.

A third embodiment of the invention is shown in FIG. 11. This valve comprises a double valve which includes essentially two single valves such as shown in FIG. 10 arranged back-to-back and secured together in a single assembly.

The valve of FIG. 11 includes two casing halves 21 each with its associated parts as shown and described in connection with the embodiment of FIGS. 1 to 5. The casing halves are arranged back-to-back as shown with a divider 90 interposed therebetween, both of the casing halves 21 and the divider being secured together by bolts 91 to form a unitary assembly.

The divider includes a rigid imperforate plate which may be formed of metal having a thickened rim portion 92 by which the divider is secured between the casing halves. The divider also includes a partition portion which defines with the diaphragms 25, the inner chambers *95a, 95b*. The valve shown in FIG. 11 is connected, for example, in a system such as shown in FIG. 1, with one casing half being connected to the lines 13 and 16 and the other half to the lines 14 and 17. Each half of the valve will then operate in a manner similar to that described in connection with the signal valve shown in FIG. 10 and described hereinabove.

Figures 13, 14, 15:
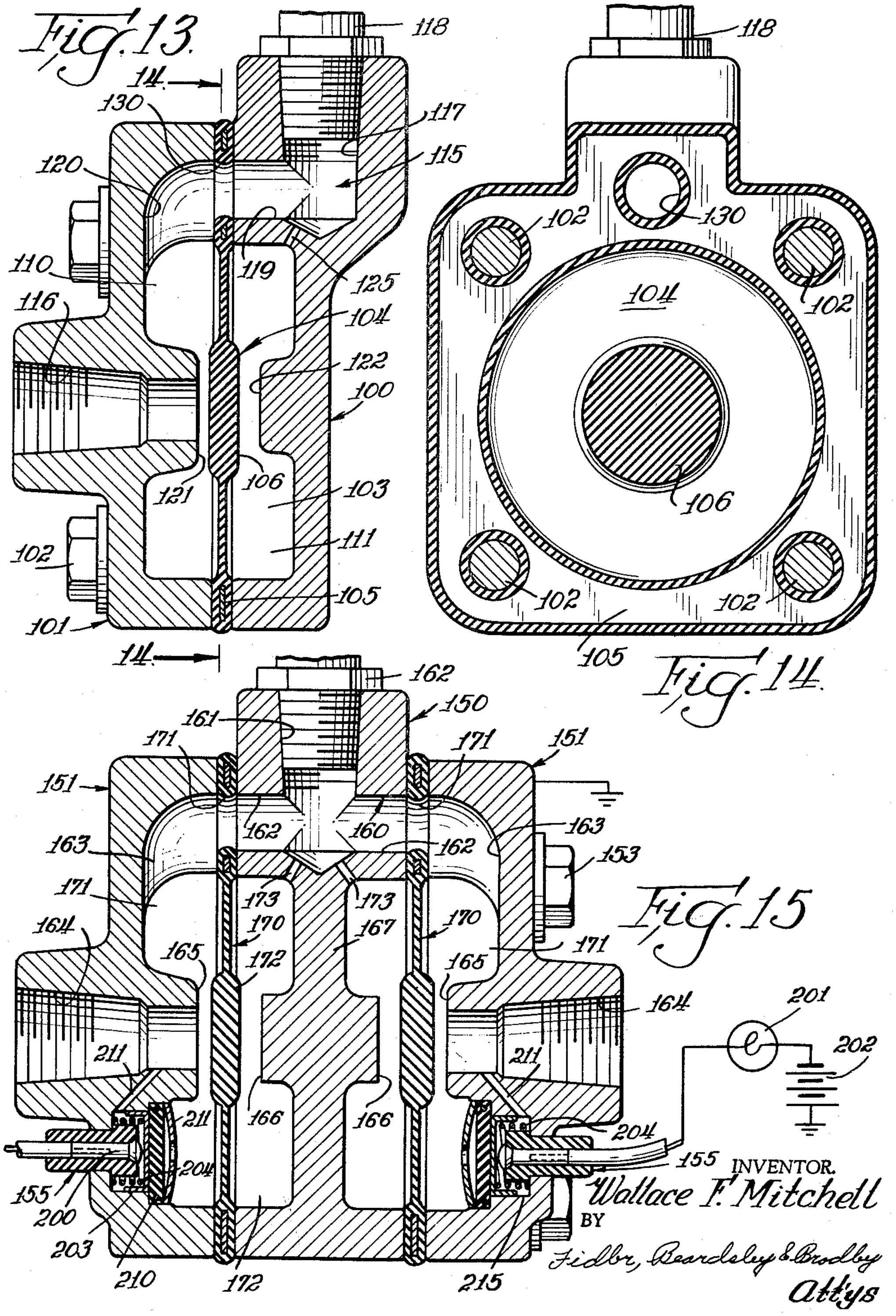
FIG. 13 is a sectional view taken along line 13—13 of FIG. 12.
FIG. 14 is a sectional view taken along line 14—14 of FIG. 12.
FIG. 15 is a vertical sectional view taken through still another embodiment of the invention.

Referring now to FIG. 13 a further form of my invention is illustrated therein. This form of the invention operates in the same general principle as those above described except that instead of employing a sensing tube such as the tube *45a* for example, other means are provided for creating a pressure drop in the inlet thus causing a pressure differential between the air flowing into the inlet passage and the air flowing through the air flow compartment. Such means takes the form of a bend in the inlet passage whereby the direction of flow of the air is changed thereby creating a differential in the pressure in the different portions of the inlet. The restricted passage is connected to the inlet passage preferably at or ahead of the bend.

The valve includes two casing sections 100 and 101 which are secured together as by bolts 102 to define a chamber 103. Clamped between the casing sections 100 and 101 is a diaphragm 104 formed of flexible, resilient material such as rubber or a rubber-like plastic such as a synthetic plastic.

At its peripheral portion, the diaphragm has imbedded therein a flat, metal ring 105 at the portion which is clamped between the casing sections. The diaphragm is provided with a thickened, central portion 106 adapted to seat against the outlet seat hereinafter described.

The diaphragm divides the chamber 103 into an air flow compartment 110 and a compensating compartment 111. An inlet passage 115 leads into the air flow compartment 110, and an outlet passage 116 also leads into the air flow compartment. The inlet passage 115, air flow compartment 110 and outlet passage 116 together form an air flow passage.

The inlet passage includes a first portion 117 which may receive a fitting 118 for connection to the air line (not shown). The inlet passage includes a second portion 119 which is disposed at an angle (preferably approximately 90°) from the first portion 117, thereby providing a bend in the inlet passage 115. The inlet passage has a third portion 120 which may be formed in the casing section 101 and which is disposed at an angle to the second section 119, thereby providing a second bend. At this point, it will be understood that only a single bend in the inlet passage is required to provide the desired results, but for convenience in manufacture the inlet has been formed as shown.

Surrounding the outlet passage 116 is a seat 121 which preferably is provided by an upstanding boss on the casing member 101. The central portion 106 of the diaphragm 104 is disposed opposite the seat 121 and is normally spaced from the seat 121, but is capable upon flexure to be moved into sealing engagement with the seat to close the outlet passage 116. Disposed opposite the seat 121 is an abutment 122 which is formed on the casing member 100 and spaced from the central portion 106 of the diaphragm to limit movement of the central portion 106 of the diaphragm away from the seat 121.

The central portion 106 of the diaphragm, while normally spaced from its seat 121, nevertheless is sufficiently close so that only a slight outward movement (movement toward the seat) is sufficient to close the outlet passage.

The diaphragm 104 is formed with an opening 130 therethrough, which registers with the inlet passage portions 119 and 120, and preferably is of the same diameter so as not to interfere with free air through the inlet passage in either direction.

A restricted passage 125 leads from the inlet passage 115 at the first bend and opens into the compensating compartment 111. The restricted passage 125 is of a size such as to limit the rate of flow of air into, or out of the compensating compartment 111 at a rate, and for a purpose as hereinafter explained.

In use, the fitting 118 is connected to an air line leading from a relay (not shown) controlling a source of compensated air (not shown). The outlet passage 116 is suitably connected as by an air line to the device to be actuated (not shown) which may be, for example, an air brake cylinder or booster (not shown). When the relay is opened, air under normal operating pressure flows into the inlet passage 115 and air under slightly reduced pressure flows through the air flow compartment 110 and out through the outlet passage 116 to the device to be actuated such as a brake cylinder or booster to actuate the latter. Upon the initial flow of air under normal operating pressure, air flows into the inlet under such pressure and into the air flow compartment under slightly less pressure. Owing to the fact that at this time there is only atmospheric pressure in the compensating compartment 103, the diaphragm 104 is displaced inwardly until halted by engagement with the stop 122.

The restricted passage 125 prevents the rapid entry of air into the compensating compartment, and thus there is no substantial opposition to the inward displacement of the diaphragm 104. After the first surge of air through the air flow compartment, which causes the actuation of the device connected to the air line, the continued application of pressure is maintained so long as the relay is energized. However, since the pressure in the inlet passage is higher than the pressure in the compensating compartment and in the air flow compartment, air flows into the compensating compartment until the pressures in the compensating compartment and in the air flow compartment are equalized. This flow into the compensating compartment results from the fact that the bend in the inlet passage causes a change in direction of the air and increases the resistance to the flow of the air so that it is at a higher pressure in the passage portion 117 than in the remaining passage portions 119 and 120 and in the air flow compartment 110. Moreover, when the restricted passage 125 is aligned with the inlet passage portion 117, there is an added force on the air due to inertia or impact. As the pressures are equalized in the compartments the diaphragm returns to its normal position wherein it is spaced closely adjacent the seat 121. The system is so designed that under normal conditions of operation the diaphragm will return to its normal position spaced from its seat when the brake cylinder, or booster, or like device is filled with air and the brakes applied, or the connected device actuated.

Thus under normal conditions the diaphragm is moved away from the seat by the initial flow of air through the air flow compartment, thereby permitting free flow of air through the air flow passage upon the initial actuation of the relay. Under normal conditions, the diaphragm returns to its normal position spaced from the seat when the flow of air has halted.

When the relay is operated to release the air actuated device, such as the brakes, a reverse flow of air occurs through the air flow passage, and the diaphragm is displaced inwardly and away from its seat so as to permit maximum flow of air through the air flow passage. The movement of the diaphragm away from its seat forces the air out of the compensating chamber.

In the event that the relay is actuated when the connected line is ruptured, or has a large leak, the continued flow of air through the air flow passage causes air to flow into the compensating compartment through the restricted passage by reason of the pressure differential between the air at the entrance to the restricted passage and air in the air flow compartment above explained. Thus the pressure of air in the compensating compartment 111 is increased so that it becomes greater than the pressure of air in the air flow compartment, and the diaphragm is urged outwardly against its seat. Thus the outlet is closed and the air flow halted.

Owing to the fact that when the diaphragm is closed there is a substantially greater area exposed to line pressure on the side of the compensating compartment than the area of the diaphragm on its other side, there is therefore a net force tending to maintain the diaphragm in closed position so long as line pressure is applied. When the relay is released, the air pressure is removed and the diaphragm, due to its resiliency, is returned to its normal position spaced from its seat.

Should there be a slow leak in the line and the brakes applied for an extended period, this would result in a loss of air. In this event, air will continue to flow through the air flow passage after the connected device is operated and, owing to the pressure differentials above explained, air will enter the compensating compartment and move the diaphragm toward closed position. As above explained, the operation of the diaphragm to close the outlet upon a slow leak is adjustably controlled by selecting the size of the restricted passage so that the flow may be made to close upon any rate of flow of air caused by a slow leak. That is to say the larger the restricted passage, the more readily will the diaphragm be closed upon the existence of a slow leak.

The type of valve as shown in FIG. 13 may be employed in the double valve as shown particularly in FIG. 15. The valve of FIG. 15 includes a central casing member 150 and a pair of similar outer casing members 151, which members are secured together by bolts 153. The outer members 151 preferably are similar in all respects to the casing member 101 above described, except that each of the former may be provided with an alarm switch 155 hereinafter described and passage means 211 for operating the alarm means.

The central member 150 is formed with an inlet passage 160 having a single portion 161 in which may be disposed a fitting 162. The first inlet passage portion 161 is connected to branch portions 162 leading in opposite directions therefrom and connecting with third inlet passage portions 163 formed in the end members 151. Each end member is formed with an outlet passage 164 having a seat 165.

Similar diaphragms 170 are clamped between each of the end members 152 and the opposing face of the central member 150, which diaphragms may be similar in all respects to the diaphragm 104 and are provided with openings 171 therein registering with the inlet passage portions 162 and 163. The diaphragms 170 have enlarged central portions 172 adapted to close against the seats 165 and against abutments 166 formed on a central partition 167 provided by the central member 150.

The diaphragms 170 provide with the end members 152 a pair of air flow compartments 171 with which the inlet passages 160 and outlet passages 164 communicate to provide air flow passages leading from the single inlet passage portion 161 and to the respective outlet passages 164.

Two compensating compartments 172 are defined by the central partition 167 and the two diaphragms 170, which compartments communicate respectively with the second portions of the inlet passage through restricted passages 173 formed in the central partition 167.

The double form of valve shown in FIG. 15 operates in a manner generally similar to the single form shown in FIG. 15. The operation of each half of the double form of valve is independent of the other half. That is to say that, if there is a rupture or leak in the line leading from one half of the double valve and the other line is intact, the latter will function to operate the connected device, such as a brake, even though the first side of the valve is closed.

Alarm means is provided for actuating an alarm in the event that the valve is closed. Such an alarm means is generally similar in principle to that above described and differs principally in structural details. Briefly, the alarm includes a switch 155 having a fixed contact 200 connected in a circuit with a signal lamp 201 and battery 202. A movable contact 203 is slidable in a socket 215 in the casing member 152 and normally urged out of the contact with the contact 200 by a spring 204, the movable contact member 203 having bearing contact with the casing member 152 which may be grounded (not shown). Disposed over the movable contact 203 is a flexible diaphragm 210, which is retained by a washer 211 secured in the casing over the diaphragm 210. An air passage 211 connects the outlet 164 with the socket 204 whereby when the pressure in the air flow compartment 171 exceeds the pressure in the outlet passage 164, the diaphragm 210 is depressed to move the movable contact 203 into contact with the fixed contact 200, and thus close the alarm circuit to energize the alarm. Thus it will be seen that it may be that there is pressure in either air flow compartment and when the corresponding diaphragm is in closed position the corresponding alarm will be energized.

The valve of the present invention and particularly the form shown in FIG. 15 lends itself admirably to incorporation in an emergency relay. As will be understood, there are a number of different forms of emergency relays, but generally they include a plurality of casing sections, at least one of which sections is provided with an outlet. In accordance with the present invention, the valve is adapted to be attached to, or have a portion formed integrally with one of the casing sections of an emergency relay.

Figures 12, 16, 17:
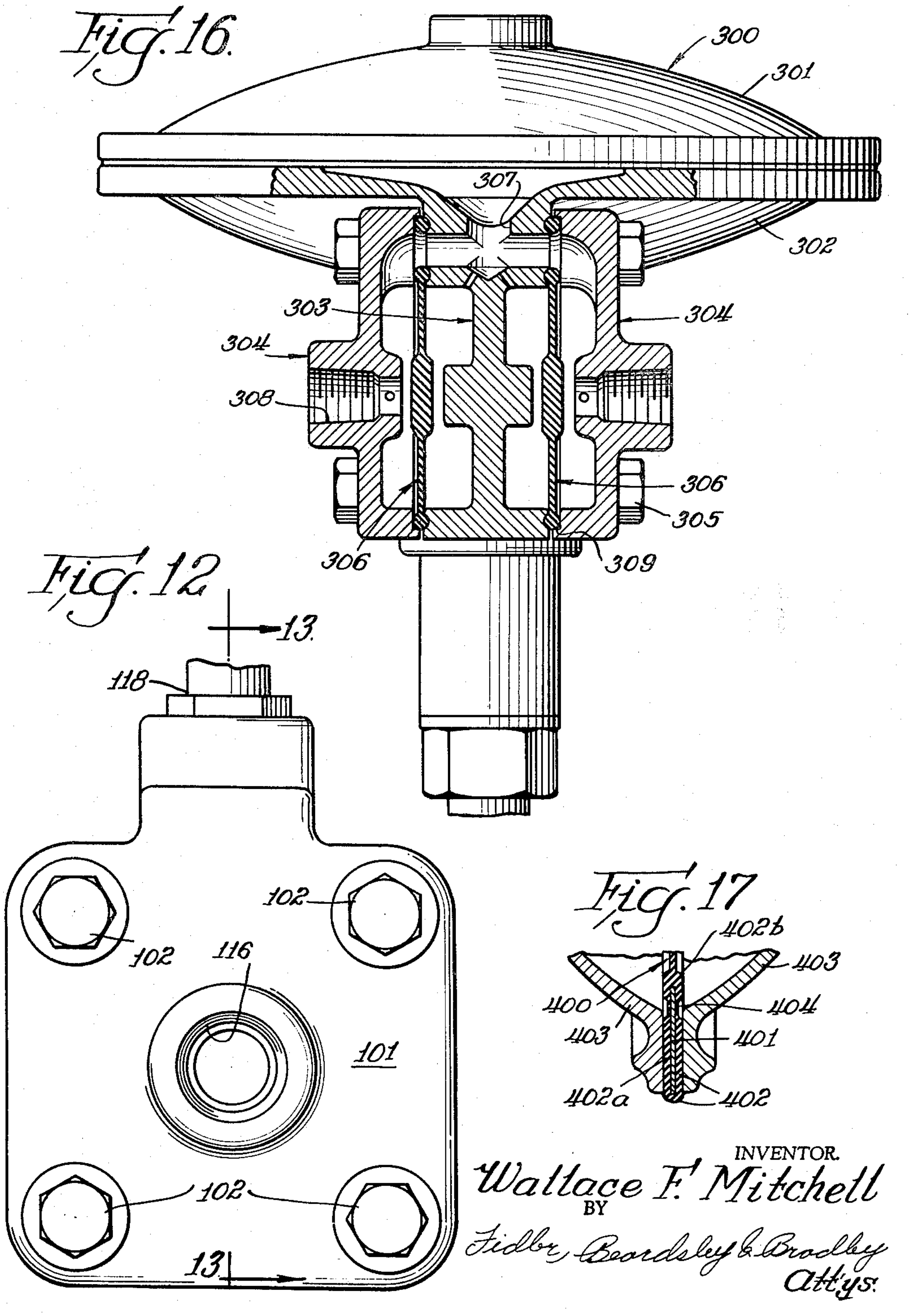
FIG. 12 is an end elevational view of a further embodiment of my invention.
FIG. 16 is an elevational view showing a further embodiment of the invention.
FIG. 17 is a fragmentary sectional view of a modified form of diaphragm usable in any of the forms of valve shown.

Referring to FIG. 16 there is shown an emergency relay 300 having casing sections 301 and 302. Formed internally with the casing section 302 is a central valve casing section 303, which is generally similar to the central casing section 150 shown in FIG. 15. Outer valve casing sections 304, which may be generally similar to the outer casing sections 151, are provided and are secured to the central casing section 303 by bolts 305. The outer casing sections 304, however, are not shown as having any alarm means, and consequently the passages, such as the passages 211, are not provided. However, they may have alarm means, if desired. Clamped between the casing sections 303 and 304 are diaphragms 306 which may be generally similar to the diaphragms 170 shown in FIG. 15. The double valve shown in FIG. 16 operates in a generally similar manner to the valve shown in FIG. 15. The inlet 307 of the valve of FIG. 16 is arranged to lead from the interior of the casing 300 as will be seen. The outlets 307 lead from their respective sections 304 to the devices to be actuated.

It will be noted that the diaphragms 306 of the valve shown in FIG. 16 differ from the previously described diaphragms in that no annular, metal, reinforcing ring is used, but instead the material forming the diaphragm is molded to provide a peripheral bead 309 which is clamped between the central casing section and the outlet casing sections.

A third form of diaphragm is shown in fragmentary form in FIG. 17 to which reference now is made. This diaphragm may be used in any form of the invention shown. The diaphragm 400 is formed in the manner similar to the diaphragm shown in FIG. 3 for example, or in FIG. 13 for example, except that the peripheral, metal, reinforcing ring 401 is imbedded in a peripheral portion 402 of the diaphragm body. The peripheral portion 402 has an outer section 402*a* which is clamped between the casing sections 403 and which terminates inwardly to short of the inner limits of the opposing peripheral face portions of the casing sections 403. The peripheral portion 402 is formed with a portion 404 of less thickness than the portions of the diaphragm on either side thereof, and the reduced-thickness diaphragm portion 404 is disposed so that it is partially opposite the opposed clamping faces of the casing sections 403 and extends inwardly beyond such faces. The peripheral portion 402 has a second thickened section 402*b* disposed inwardly from the portion of reduced thickness.

The aforesaid diaphragm arrangement is such that when the casing sections 403 are clamped together and pulled up tight to provide a firm support for the diaphragm and to hold the diaphragm in sealing engagement with the casing sections 403, the outer thickened section 402*a* of the diaphragm is permitted to flow inwardly, but the section 402*b* of the diaphragm inwardly of the portion 404 of reduced thickness is not affected by the clamping action. Accordingly, there is no distortion of the diaphragm inwardly of the metal reinforcing ring 401. This is an important feature of applicant's invention, inasmuch as it is usually important to insure against any desired distortion of the working portion of the diaphragm—that is the portion of the diaphragm which flexes to permit the central portion to move into and out of engagement with the seat.

In all forms of the invention, the timing of the closing of the diaphragm upon the existence of the rupture of or leak in the line can be controlled by appropriately selecting the size of the restricted passage. Thus, if it is desired that the diaphragm close rapidly, the restricted passage is made larger, and if it is desired that the diaphragm close more slowly, the restricted passage is made smaller.

It will be seen from the foregoing that the present invention provides a safety valve which is completely reliable and which is effective to stop the flow of fluid to a broken line. The arrangement is such that if only one of two parallel lines connected to the valve is broken the brake connected to the other line may be operated normally, except in the embodiment wherein the single form of valve such as shown in FIGS. 10 or 12 is used to control both parallel lines. The breakage of the other line will not interfere in any way with the operation of the unbroken line. The valve provides for a rapid cut-off of the air to the broken line. On the other hand, the diaphragm arrangement is such that there is no restriction of flow of air to the air brake lines. In fact, during both the application and the release of the brakes, the diaphragms are moved away from their respective seats so that there is not interference with the flow of air through the seats.

In the foregoing description the passage into the valve casing which is connected to the source of air under pressure is designated for convenience as the "inlet" and the passage into the valve casing which is connected to the device to be operated, such as a brake cylinder or booster is designated as this "outlet." It will be understood that the foregoing terms describe the functions of these elements during the flow of air from the source to the operated device but when the relay is operated to release the air pressure in this device the air will flow through the casing in the opposite direction, that is in through the "outlet" and out through the "inlet."

The diaphragm is caused to move upon each application of the brakes and upon each release of the brakes, regardless of whether the air lines are intact or are broken. Thus the diaphragm is frequently flexed and consequently the material forming the diaphragm maintains its "liveness" over a long period of use.

This application is a continuation-in-part of my copending application Serial No. 16,700 filed March 20, 1960.

I claim:

1. A valve for a compressed fluid system comprising a casing defining a chamber, a resilient flexible diaphragm dividing said chamber into a fluid flow compartment and a compensating compartment, said casing having an inlet opening into said flow compartment and an outlet opening into said flow compartment and a seat disposed opposite the central portion of said diaphragm, said diaphragm when in an unflexed state being in proximity to but movable away from said seat, and means defining a passage leading from said inlet and having an orifice opening into said compensating compartment of such size whereby fluid flows into said compenating compartment at a rate slower than it flows through said fluid flow compartment thereby to cause said diaphragm to be moved away from said seat during the initial flow of fluid into said fluid flow compartment but to return to the normal position as the pressure in said compensating compartment increases toward the pressure in said fluid flow compartment.

2. A valve for a pressurized fluid system, comprising a casing defining a chamber, a resilient flexible diaphragm dividing said chamber into a fluid flow compartment and a compensating compartment, said casing having an inlet and an outlet opening into said fluid flow compartment, a seat surrounding said outlet and disposed opposite the central portion of said diaphragm, said diaphragm being normally spaced from but movable into closing relation with said seat, a tube defining a passage leading from said inlet and opening into said compensating compartment of a size whereby fluid flows into said compensating compartment at a rate slower than it flows through said fluid flow compartment, said tube projecting laterally into said inlet and having an opening at least partially disposed in the direction of fluid flow, whereby, a continued flow of fluid into said flow compartment causes the pressure in said compensating compartment to exceed the pressure in said flow compartment to move said diaphragm against said seat.

3. A valve as set forth in claim 2 wherein said opening in said tube is inclined in the direction of fluid flow into said air flow compartment.

4. A valve as set forth in claim 2 comprising a second flexible diaphragm in said casing defining a second fluid flow compartment having an inlet and an outlet connected thereto, said diaphragm defining therebetween a single compensating compartment for both said flow compartments.

5. A valve as set forth in claim 2 wherein said inlet extends in a direction substantially parallel to the plane of said diaphragm when said diaphragm is in an unflexed condition.

References Cited in the file of this patent

UNITED STATES PATENTS

| | | |
|---|---|---|
| 2,103,349 | Conant et al. | Dec. 28, 1937 |
| 2,624,176 | Osborne | Jan. 6, 1953 |
| 2,944,856 | Swanson | July 12, 1960 |
| 2,992,652 | Fellberg | July 18, 1961 |
| 3,002,521 | Greenlees et al. | Oct. 3, 1961 |

FOREIGN PATENTS

| | | |
|---|---|---|
| 1,115,245 | France | Dec. 26, 1955 |